(12) United States Patent
Myokan (10) Patent No.: US 9,497,441 B2
(45) Date of Patent: *Nov. 15, 2016

(54) IMAGE PROCESSING DEVICE AND METHOD, AND PROGRAM

(71) Applicant: SONY CORPORATION, Tokyo (JP)

(72) Inventor: Yoshihiro Myokan, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/603,795

(22) Filed: Jan. 23, 2015

(65) Prior Publication Data

US 2015/0138323 A1    May 21, 2015

Related U.S. Application Data

(63) Continuation of application No. 13/558,792, filed on Jul. 26, 2012.

(30) Foreign Application Priority Data

Aug. 3, 2011 (JP) .................................. 2011-170270

(51) Int. Cl.
*H04N 13/02* (2006.01)
*H04N 13/00* (2006.01)

(52) U.S. Cl.
CPC .. *H04N 13/0239* (2013.01); *H04N 2013/0074* (2013.01)

(58) Field of Classification Search
USPC .......................................... 348/46, 45, 51, 5
See application file for complete search history.

(56) References Cited

U.S. PATENT DOCUMENTS

| 6,453,069 B1 * | 9/2002 | Matsugu | G06K 9/48 382/173 |
| 8,223,193 B2 * | 7/2012 | Zhao | G01D 1/00 348/42 |
| 9,077,990 B2 * | 7/2015 | Muni | H04N 19/172 |

(Continued)

FOREIGN PATENT DOCUMENTS

| CN | 101909220 A | 12/2010 |
| CN | 101990108 A | 3/2011 |
| JP | 10-336701 | 12/1998 |

OTHER PUBLICATIONS

Mar. 30, 2015, CN communication issued for related CN application No. 201210264650.8.

*Primary Examiner* — Paulos M Natnael
(74) *Attorney, Agent, or Firm* — Paratus Law Group, PLLC (57) ABSTRACT

There is provided an image processing device including capturing portions that respectively capture a first image and a second image that form an image for a right eye and an image for a left eye which can be stereoscopically viewed in three dimensions, a comparison portion that compares the first image and the second image captured by the capturing portions, a determination portion that determines, based on a comparison result of the comparison portion, which of the first image and the second image is the image for the right eye and which is the image for the left eye, and an output portion that outputs each of the first image and the second image, as the image for the right eye and the image for the left eye, based on a determination result of the determination portion.

18 Claims, 7 Drawing Sheets

(56) References Cited

U.S. PATENT DOCUMENTS

| | | | | |
|---|---|---|---|---|
| 2001/0005219 A1* | 6/2001 | Matsuo | ............... | G01S 3/7865 |
| | | | | 348/169 |
| 2005/0238257 A1* | 10/2005 | Kaneda | ............. | G06K 9/00463 |
| | | | | 382/305 |
| 2007/0140528 A1* | 6/2007 | Anai | ............. | G06T 7/0028 |
| | | | | 382/106 |
| 2009/0213235 A1* | 8/2009 | Watanabe | ......... | H04N 5/23248 |
| | | | | 348/208.4 |
| 2011/0157315 A1* | 6/2011 | Bennett | ............. | G06F 3/14 |
| | | | | 348/46 |
| 2012/0019613 A1* | 1/2012 | Murray | ............. | H04N 13/0007 |
| | | | | 348/36 |
| 2012/0019614 A1* | 1/2012 | Murray | ............. | H04N 13/0007 |
| | | | | 348/36 |
| 2012/0050561 A1* | 3/2012 | Kitajima | .......... | G06F 17/30265 |
| | | | | 348/222.1 |
| 2012/0092329 A1* | 4/2012 | Koo | ............. | G06K 9/3258 |
| | | | | 345/419 |
| 2012/0268570 A1* | 10/2012 | Trumbull | .......... | H04N 13/0296 |
| | | | | 348/47 |
| 2013/0124414 A1* | 5/2013 | Roach | ............. | G06Q 20/10 |
| | | | | 705/44 |

* cited by examiner

IMAGE PROCESSING DEVICE AND METHOD, AND PROGRAM

CROSS-REFERENCE TO PRIOR APPLICATION

This application is a continuation of U.S. patent application Ser. No. 13/558,792 (filed on Jul. 26, 2012), which claims priority to Japanese Patent Application No. 2011-170270 (filed on Aug. 3, 2011), which are all hereby incorporated by reference in their entirety.

BACKGROUND

The present technology relates to an image processing device and method, and to a program, and particularly relates to an image processing device and method, and a program that make it possible, when two camera modules are used as one stereo camera, to associate the two camera modules respectively as the camera module to capture an image for the right eye and the camera module to capture an image for the left eye.

In recent years, a 3D (three-dimensional stereoscopic view) television has been commercialized, as well as a photographic device (a stereo camera) that captures stereo images (images that have disparity between right and left cameras) in order to realize the stereoscopic view.

Under these circumstances, there is a demand to realize a stereo camera using a low-cost versatile camera module.

In order to realize stereo photography using a stereo camera, it is at least necessary to make an adjustment such that it can be identified which of right and left camera modules are photographing the image for the left eye and the image for the right eye respectively. An adjustment technology that is necessary for such stereo photography using a stereo camera has been disclosed in, for example, Japanese Patent Application Publication No. JP-A-10-336701.

SUMMARY

However, in order to realize the type of adjustment technology described in Japanese Patent Application Publication No. JP-A-10-336701, a device with an elaborate structure becomes necessary, and it becomes highly costly when it comes to realizing a stereo camera using a low-cost versatile camera module. Therefore, in order to realize the stereo camera using the low-cost versatile camera module, a technology is necessary that can identify right and left images using a more simple method.

In order to realize a stereo camera in a simple manner using existing technology, a stereo camera in which two camera modules are integrated and modularized as one camera module is generally used. With this kind of structure, as a matter of course, the two cameras cannot be used independently from each other. More specifically, when capturing a stereo image, even though it is effective to change a baseline in accordance with a distance to a target object and a calculated disparity amount, with the modularized structure integrated into one module, it may not be possible to change a distance between cameras (a baseline) freely. Of course, there is a structure that integrates multiple modules into one module in a manner that enables the baseline to be changed, but in this case, the structure becomes complex, resulting in a cost increase.

Here, it is conceivable to fix two general-purpose cameras using a jig with which it is possible to fix two camera modules, and to capture stereo images. At this time, when the camera modules are connected to a device, it is necessary to associate which of the two camera modules corresponds to the left camera for an image for the left eye and which corresponds to the right camera for an image for the right eye in the stereo camera.

The present technology has been devised in light of the foregoing circumstances and makes it possible, in particular, to easily associate which image is an image for the left eye and which is an image for the right eye of images captured using two camera modules in a stereo camera when two camera modules are integrated and form a simple modularized camera.

According to an aspect of the present technology, an image processing device includes capturing portions that respectively capture a first image and a second image that form an image for a right eye and an image for a left eye which can be stereoscopically viewed in three dimensions, a comparison portion that compares the first image and the second image captured by the capturing portions, a determination portion that determines, based on a comparison result of the comparison portion, which of the first image and the second image is the image for the right eye and which is the image for the left eye, and an output portion that outputs each of the first image and the second image, as the image for the right eye and the image for the left eye, based on a determination result of the determination portion.

The capturing portions may further include a prompting portion that prompts a user to pass a hand in front of one of the capturing portions that captures one of the image for the left eye and the image for the right eye. The comparison portion may compare a luminance or chroma saturation of each of the first image and the second image captured by the capturing portions, and the determination portion may determine, using a comparison result of the comparison portion, which of the first image and the second image has the lower luminance or chroma saturation, thus determining which has been subject to the prompting by the prompting portion and determining which of the first image and the second image is the image for the left eye and which is the image for the right eye.

The comparison portion may extract a block of a predetermined size at a predetermined position of the first image, may perform template matching of the extracted block on the second image, and may compare a position of a matching block on the second image with a position of the predetermined block on the first image, and the determination portion, based on a relationship in the left-right direction between the position of the matching block on the second image and the position of the predetermined block on the first image, may determine which of the first image and the second image is the image for the left eye and which is the image for the right eye.

According to an aspect of the present technology, an image processing method includes capturing, using capturing portions that respectively capture a first image and a second image that form an image for a right eye and an image for a left eye which can be stereoscopically viewed in three dimensions, the first image and the second image that form the image for the right eye and the image for the left eye which can be stereoscopically viewed in three dimensions, comparing, using a comparison portion that compares the first image and the second image captured by the capturing portions, the first image and the second image captured in processing in the capturing, determining, using a determination portion that determines, based on a comparison result of the comparison portion, which of the first image and the second image is the image for the right eye and which is the image for the left eye, which of the first image and the second image is the image for the right eye and which is the image for the left eye based on a comparison result obtained in processing in the comparing, and outputting, using an output portion that outputs each of the first image and the second image, as the image for the right eye and the image for the left eye, based on a determination result of the determination portion, each of the first image and the second image as the image for the right eye and the image for the left eye based on a determination result obtained in processing in the determining.

According to an aspect of the present technology, a program includes instructions that command a computer that controls an image processing device including capturing portions that respectively capture a first image and a second image that form an image for a right eye and an image for a left eye which can be stereoscopically viewed in three dimensions, a comparison portion that compares the first image and the second image captured by the capturing portions, a determination portion that determines, based on a comparison result of the comparison portion, which of the first image and the second image is the image for the right eye and which is the image for the left eye, and an output portion that outputs, as the image for the right eye and the image for the left eye, each of the first image and the second image based on a determination result of the determination portion, the instructions commanding the computer to perform capturing, using the capturing portions, each of the first image and the second image that form the image for the right eye and the image for the left eye which can be stereoscopically viewed in three dimensions, comparing, using the comparison portion, the first image and the second image captured in processing in the capturing, determining, using the determination portion, which of the first image and the second image is the image for the right eye and which is the image for the left eye based on a comparison result obtained in processing in the comparing, and outputting, using the output portion, each of the first image and the second image as the image for the right eye and the image for the left eye, based on a determination result obtained in processing in the determining.

According to an aspect of the present technology, a first image and a second image that form an image for the right eye and an image for the left eye which can be stereoscopically viewed in three dimensions are captured. The captured first image and second image are compared, and, based on a comparison result, it is determined which of the first image and the second image is the image for the right eye and which is the image for the left eye. Each of the first image and the second image is output as the image for the right eye and the image for the left eye based on a determination result.

The image processing device according to an embodiment of the present technology may be an independent device or a block that performs image processing.

According to the aspect of the present technology, when a stereo camera that captures stereo images is formed by two camera modules, it is possible to associate the images captured by the respective camera modules with the image for the left eye and the image for the right eye.

DETAILED DESCRIPTION OF THE EMBODIMENT(S)

Hereinafter, embodiments to implement the present disclosure (hereinafter referred to as embodiments) will be described. Note that a description will be made in the following order.

1. First embodiment (an example of a case in which an image for a left eye and an image for a right eye are determined based on a difference in luminance)

2. Second embodiment (an example of a case in which an image for a left eye and an image for a right eye are determined based on displacement)

1. First Embodiment

Structural Example of Image Processing Portion

Figure 1:
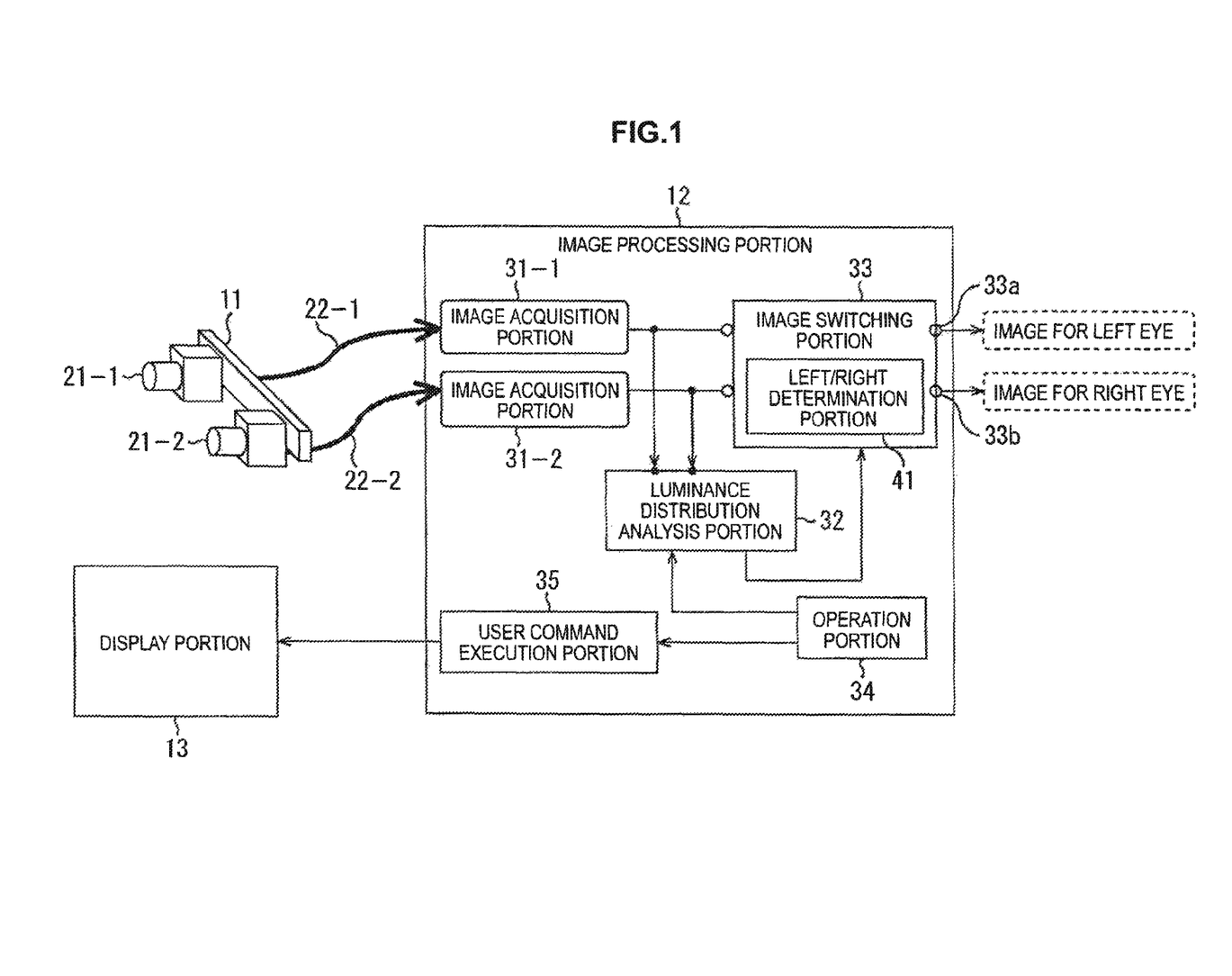
FIG. 1 is a block diagram showing a structural example of a first embodiment of an image processing portion to which the present technology is applied.

FIG. 1 shows a structural example of a first embodiment of an image processing portion to which the present technology is applied. When camera modules 21-1 and 21-2 function as one modularized stereo camera that is fixed by a fixing jig 11, an image processing portion 12 shown in FIG. 1 outputs two captured images after mapping them to an image for a left eye and an image for a right eye respectively.

More specifically, the camera modules 21-1 and 21-2 are fixed by the fixing jig 11 such that they are separated from each other in the horizontal direction. The camera modules 21-1 and 21-2 are detachably fixed with respect to the fixing jig 11 and have a structure in which a distance to an object, a calculated disparity etc. cannot be changed. However, with respect to the fixing jig 11, the camera modules 21-1 and 21-2 may have a structure in which the distance to the object, the calculated disparity etc. can be changed, and in this case, they need to be used while being fixed. Further, for example, the camera modules 21-1 and 21-2 capture an image having a size of 640 pixels in the horizontal direction and 480 pixels in the vertical direction and output the image to the image processing portion 12 via wireless or wired communication paths 22-1 and 22-2 respectively. The communication path 22-1 and the communication path 22-2 may be a wired communication path using a cable such as a general-use serial bus as represented by a Universal Serial Bus (USB) etc. or a wireless communication path such as a wireless Local Area Network (LAN) as represented by an Institute of Electrical and Electronic Engineers (IEEE) 802.11 etc. Note that when there is no particular need to distinguish between the camera modules 21-1 and 21-2 and the communication paths 22-1 and 22-2 respectively, they are simply referred as a camera module 21 and a communication path 22 and other structural portions are also referred in a similar manner. Further, it is needless to say that the size of the image that is captured by the camera module 21 is not limited to and may be a size other than the size of 640 pixels in the horizontal direction and 480 pixels in the vertical direction.

The image processing portion 12 outputs two images that are input via the communication paths 22-1 and 22-2 after mapping the two images to the image for the left eye and the image for the right eye respectively.

A display portion 13 is controlled by the image processing portion 12 and presents an instruction message to a user. The display portion 13 is not limited to a display device such as a liquid crystal display (LCD) and a signal device etc. may be used that can only create two expressions by simply turning on and off a light, for example, as long as it can indicate a timing to prompt the user to pass a hand in front of a camera, as will be explained below.

More specifically, the image processing portion 12 includes image acquisition portions 31-1 and 31-2, a luminance distribution analysis portion 32, an image switching portion 33, an operation portion 34 and a user command execution portion 35. The image acquisition portions 31-1 and 31-2 acquire the images captured by the camera modules 21-1 and 21-2 via the communication paths 22-1 and 22-2 respectively, and supply the images to the luminance distribution analysis portion 32 and the image switching portion 33.

The luminance distribution analysis portion 32 analyzes the luminance distribution of the respective images that are supplied from the image acquisition portions 31-1 and 31-2 and, while also detecting whether or not there is any action by the user, supplies average luminance values to the image switching portion 33 as an analysis result, the average luminance values being a luminance distribution acquired from the respective images.

Based on the detection result from the luminance distribution analysis portion 32, the image switching portion 33 determines which of the two images supplied from the luminance distribution analysis portion 32 (which are originally supplied from the image acquisition portions 31-1 and 31-2) is the image for the left eye and which is the image for the right eye. More specifically, the image switching portion 33 is provided with a left/right determination portion 41 and the left/right determination portion 41 determines which of the two images is the image for the left eye and which is the image for the right eye, based on the respective average luminance values and based on an image that is considered to have been manipulated by the user and on an image that has not been manipulated. Then, the image switching portion 33 outputs the determined image for the left eye and image for the right eye from a left eye image output terminal 33a and a right eye image output terminal 33b, respectively. Note that, as long as it is possible for the image switching portion 33 to output the input two images after mapping them to the image for the left eye and the image for the right eye, a digital signal itself that transmits an image signal may be electrically switched using a selector circuit or the like and may be output. Further, the image switching portion 33 may output the image for the left eye and the image for the right eye, respectively, by software switching of a frame memory address that is referred to by a microprocessor or a digital signal processor (DSP) or the like.

The operation portion 34 is formed of operation buttons and the like. When the operation portion 34 is operated to command a start of left and right image recognition processing, which will be explained with reference to FIG. 2, the operation portion 34 generates an operation signal in accordance with the operation and supplies the operation signal to the luminance distribution analysis portion 32 and the user command execution portion 35.

Based on the operation signal from the operation portion 34, the user command execution portion 35 causes a message to be displayed on the display portion 13 that asks the user to perform an action to pass a hand in front of either the camera module 21-1 that captures the image for the left eye or the camera module 21-2 that captures the image for the right eye.

Left and Right Image Recognition Processing

Figure 2:
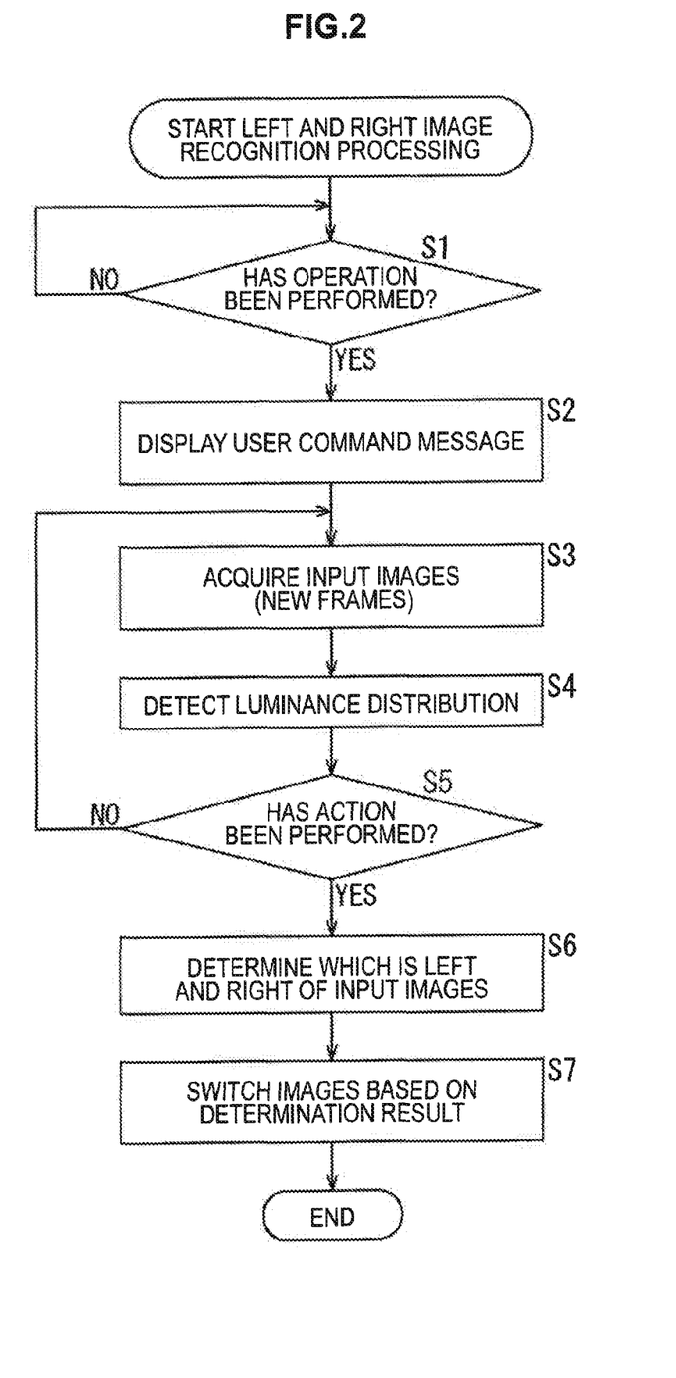
FIG. 2 is a flowchart illustrating left and right image recognition processing by the image processing portion shown in FIG. 1.

Next, the left and right image recognition processing by the image processing portion 12 shown in FIG. 1 will be explained with reference to a flowchart shown in FIG. 2.

At step S1 the operation portion 34 determines whether or not the user has performed the operation to start the left and right image recognition processing. The same determination processing is repeated until it is determined that the operation has been performed. Then, at step S1, when the operation portion 34 is operated in order for the user to command the start of the left and right image recognition processing, a signal that commands the start of the left and right image recognition processing is supplied to the luminance distribution analysis portion 32 and to the user command execution portion 35.

Figure 3:
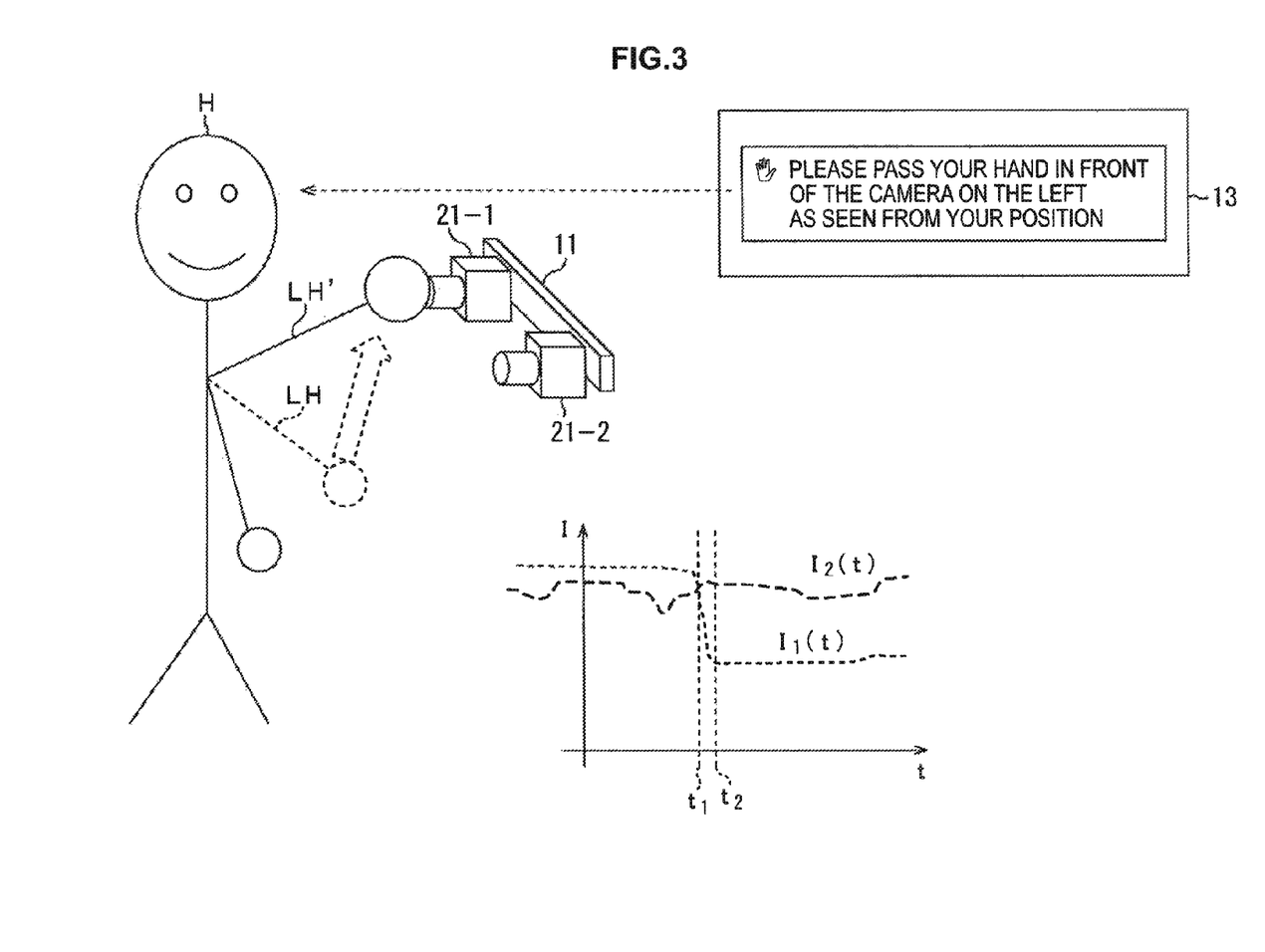
FIG. 3 is a diagram illustrating the left and right image recognition processing by the image processing portion shown in FIG. 1.

At step S2, the user command execution portion 35 causes a user command message to be displayed on the display portion 13 and thus presented to a user H, such as the message "Please pass your hand in front of the camera on the left as seen from your position" which is shown in the upper right section of FIG. 3.

At step S3, the image acquisition portions 31-1 and 31-2 acquire images of new frames that have been captured by the camera modules 21-1 and 21-2 via the communication paths 22-1 and 22-2, respectively, and supply the new frames to each of the luminance distribution analysis portion 32 and the user command execution portion 35.

At step S4, the luminance distribution analysis portion 32 calculates, for each of the images supplied from the image acquisition portions 31-1 and 31-2, average luminance values I1 (t) and I2 (t), which are average values of the luminance values in units of pixels. The average luminance values I1 (t) and I2 (t) are an analysis result of the luminance distribution.

At step S5, based on the average luminance values I1 (t) and I2 (t), the luminance distribution analysis portion 32 determines whether or not the user has performed the action, namely, whether or not the user has passed his or her hand in front of the camera. More specifically, the luminance distribution analysis portion 32 determines whether or not the user has performed the action of passing his or her hand over the camera by calculating an absolute value of a difference between the average luminance values |Idif (t)| (=|I1 (t)−I2 (t)|) and basing the determination on whether or not the difference is greater than a predetermined threshold value. In other words, as shown in the left section of FIG. 3, for example, when a hand LH (indicated by a dotted line) of the user H is not in front of the camera module 21-1 that is on the left side as seen by the user H, the average luminance values I1 (t) and I2 (t) are both substantially the same. Thus, the absolute value of the difference between the average luminance values |Idif (t)| is approximately zero. Therefore, when there is no such action, namely, when the hand has not been passed in front of either of the camera modules 21-1 and 21-2, it is determined that the action has not been performed, and the processing returns to step S3. Specifically, at step S5, the processing from step S3 to step S5 is repeated until it is determined that the action has been performed.

Then, at step S5, as shown in the left section of FIG. 3, for example, when a hand LH' (indicated by a solid line) of the user H is passed in front of the capturing direction of the camera module 21-1 that is on the left side as seen by the user H, the whole of the image that is captured by the camera module 21-1 becomes a dark image. Therefore, in this kind of case, as shown in the lower right section of FIG. 3, the average luminance value I1 (t) of the image captured by the camera module 21-1 is lower than the average luminance value I2 (t) of the image captured by the camera module 21-2. In the lower right section of FIG. 3, a vertical axis indicates the average luminance values and a horizontal axis indicates a time series average luminance value waveform on which time is indicated. It can be seen that the camera module 21-1 is covered by the hand LH' as shown in the left section of FIG. 3 at a timing from t1 to t2. Thus, from the time point t2 onward, the absolute value of the difference between the average luminance values |Idif (t)|(=|I1 (t)−I2 (t)|) is a value greater than the predetermined threshold value, and thus, at step S5, it is recognized that the action has been performed, namely, that the hand has been passed in front of the camera module 21-1, and the processing advances to step S6.

At step S6, the luminance distribution analysis portion 32 supplies the average luminance values I1 (t) and I2 (t) to the image switching portion 33, as information to identify each of the images. The image switching portion 33 controls the left/right determination portion 41 and causes the left/right determination portion 41 to determine which of the images supplied, respectively, from the image acquisition portions 31-1 and 31-2 is the image for the left eye and which is the image for the right eye. More specifically, the left/right determination portion 41 determines that an identification signal of the image with the lower average luminance value is the image for the right eye captured by the camera module 21-1. In other words, in the stereo camera module that is formed by the camera modules 21-1 and 21-2, the camera module 21-1 that is on the left side as seen from the user will capture the image for the right eye of the field of view corresponding to the right side. Similarly, in the stereo camera module, the camera module 21-2 that is on the right side as seen from the user will capture the image for the left eye of the field of view corresponding to the left side, the image for the left eye having the higher average luminance value.

At step S7, based on the determination result of the left/right determination portion 41, the image switching portion 33, of the images supplied respectively from the image acquisition portions 31-1 and 31-2, outputs the image determined to be the image for the left eye from the left eye image output terminal 33a and outputs the image determined to be the image for the right eye from the right eye image output terminal 33b.

Specifically, in the case shown in FIG. 3, the average luminance value I1 (t) of the image from the image acquisition portion 31-1 that has been captured by the camera module 21-1 is lower than the average luminance value I2 (t) of the image from the image acquisition portion 31-2 that is captured by the camera module 21-2. As a result, the image supplied from the image acquisition portion 31-1 is output from the right eye image output terminal 33b as the image for the right eye, and the image supplied from the image acquisition portion 31-2 is output from the left eye image output terminal 33a as the image for the left eye.

By the above-described processing, it is possible to identify which of the images captured by the camera modules 21-1 and 21-2 are, respectively, the image for the left eye and the image for the right eye. It should be noted that the above explanation has been made of a case in which the user command is issued to pass the hand in front of the camera module 21-1 that is on the left side as seen from the user. However, it goes without saying that the user command may be issued to pass the hand in front of the camera module 21-2 that is on the right side as seen from the user. In this case, the recognition of left and right, namely, the magnitude relationship between the average luminance values I1 (t) and I2 (t) is reversed. Further, in the above explanation, when the absolute value of the difference between the average luminance values is greater than the predetermined threshold value, it is determined that the action has been performed by the user, and left and right are recognized based on the magnitude relationship between the average luminance values at that time. However, when an image of the hand can be recognized in the image captured by the camera module 21-1 in front of which the hand is passed, this may be considered that the action has been performed, and left and right may be recognized by the camera module 21-1 that has captured the image of the hand. In this type of case, image recognition technology to recognize the image of the hand by learning is necessary. For details of this type of image recognition technology, for example, please refer to "Hand Shape Recognition based on SVM and online learning with HOG," the Institute of Electronics, Information and Communication Engineers (IEICE) technical report 109 (471), 459-464, 2010 Mar. 15. In addition, the above explanation is made using an example in which the average luminance values of the two images are used, but it is sufficient that it be recognized that the hand has been passed in front of the camera and average chroma saturation or a combination of the average luminance values and average chroma saturation of the two images may be used.

2. Second Embodiment

Another Structural Example of Image Processing Portion

Above, the example is explained in which the user is required to perform an action of passing his or her hand in front of the camera module, and the image for the left eye and the image for the right eye can be recognized in accordance with that action. However, a recognition method is not limited to the above-described example. For example, disparity (displacement) between the two images may be calculated such that the image for the left eye and the image for the right eye can be identified solely from the images based on that disparity (displacement), without requiring any action from the user.

Figure 4:
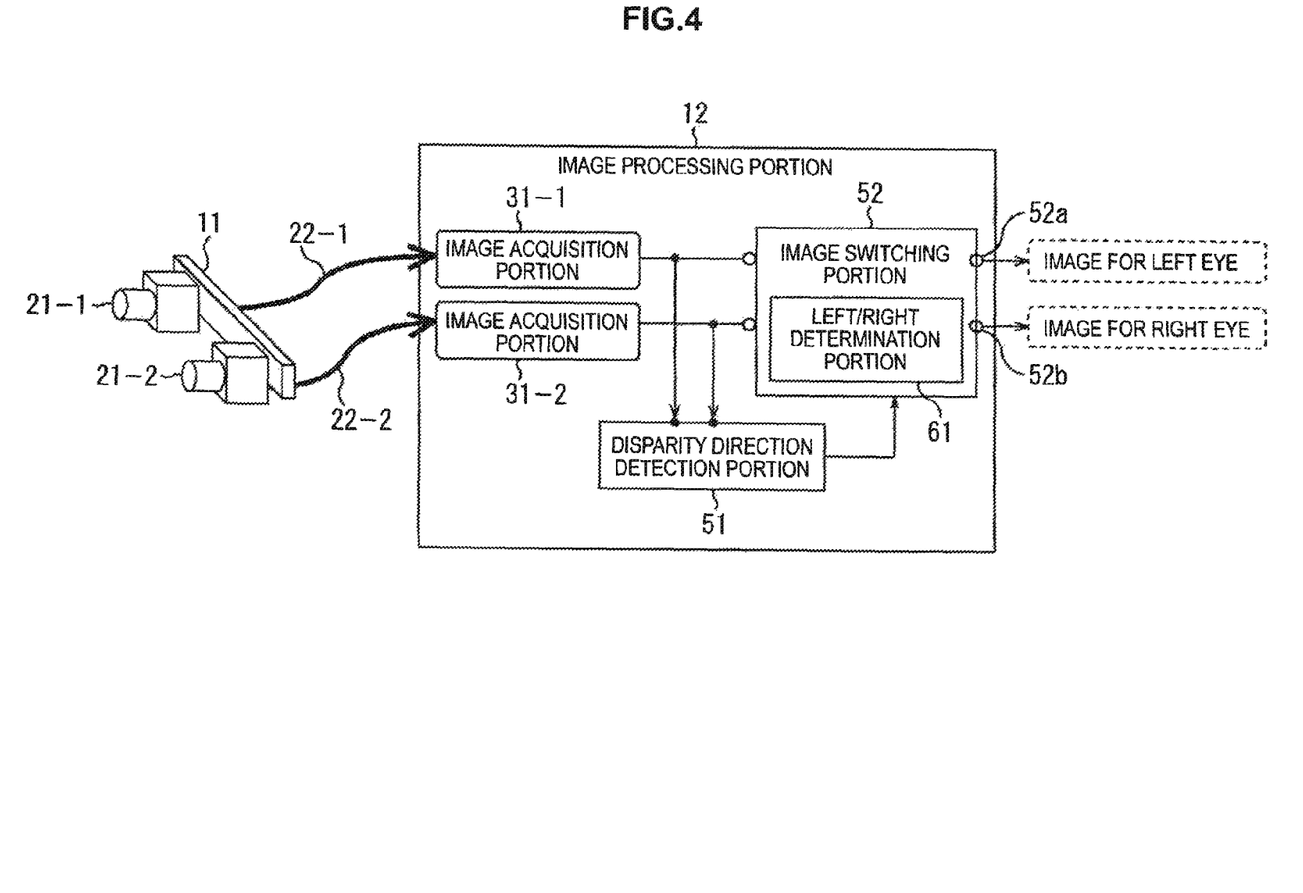
FIG. 4 is a block diagram showing a structural example of a second embodiment of the image processing portion to which the present technology is applied.

FIG. 4 shows a structural example in which the image processing portion 12 can identify the image for the left eye and the image for the right eye solely from images, using disparity (displacement). Note that, in FIG. 4, structural members that have the same functions as those of the image processing portion 12 shown in FIG. 1 are assigned the same names and reference numerals and an explanation thereof is omitted here as applicable.

In the image processing portion 12 shown in FIG. 4, points of difference with the image processing portion 12 shown in FIG. 1 are that the image processing portion 12 shown in FIG. 4 is provided with a disparity direction detection portion 51 in place of the luminance distribution analysis portion 32, the operation portion 34, and the user command execution portion 35 and with an image switching portion 52 that corresponds to the disparity direction detection portion 51 in place of the image switching portion 33.

By performing template matching in units of blocks to calculate correspondence of feature points between the input two images, the disparity direction detection portion 51 performs a statistical calculation to determine, as a displacement evaluation value, in which direction the disparity exists between the images. Information of the calculated displacement evaluation value is supplied to the image switching portion 52.

The image switching portion 52 is provided with a left/right determination portion 61 that, based on the displacement evaluation value supplied from the disparity direction detection portion 51, maps the images supplied from the image acquisition portions 31-1 and 31-2 to the image for the left eye and the image for the right eye. Based on a determination result of the left/right determination portion 61, of the images supplied from the image acquisition portions 31-1 and 31-2, the image switching portion 52 outputs the image for the left eye from a left eye image output terminal 52a and outputs the image for the right eye from a right eye image output terminal 52b.

Left and Right Image Recognition Processing

Figure 5:
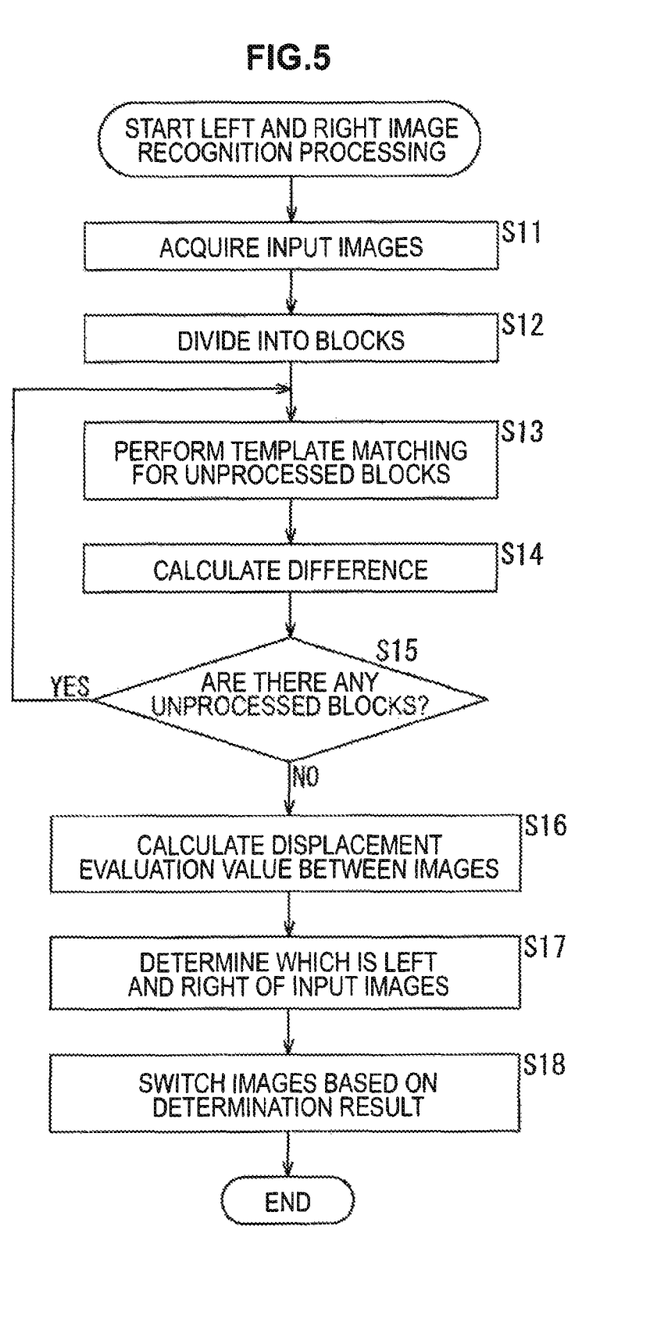
FIG. 5 is a flowchart illustrating left and right image recognition processing by the image processing portion shown in FIG. 4.

Next, left and right image recognition processing performed by the image processing portion 12 shown in FIG. 4 will be explained with reference to a flowchart shown in FIG. 5.

At step S11, the image acquisition portions 31-1 and 31-2 acquire images that have been captured by the camera modules 21-1 and 21-2 via the communication paths 22-1 and 22-2, respectively, and supply the acquired images to the disparity direction detection portion 51 and the image switching portion 52.

At step S12, the disparity direction detection portion 51 divides up the images supplied from the image acquisition portions 31-1 and 31-2 into blocks of 16 pixels by 16 pixels, for example. Each of these blocks is taken as a template. Note that the size of the block is not limited to this example and may be a size other than the size described here.

At step S13, of the image supplied from the image acquisition portion 31-1, the disparity direction detection portion 51 sets unprocessed blocks as a reference area and performs template matching with respect to each of the blocks of the image supplied from the image acquisition portion 31-2, and searches for a corresponding area in the image supplied from the image acquisition portion 31-2. Note that, for a specific technique for performing the template matching, please refer to "Computer Image Processing," edited by Hideyuki Tamura, Ohmsha Ltd., 8.2 Position Detection using Two-dimensional Template Matching, p. 252-259, ISNB4-274-13264-1, for example.

Figure 6:
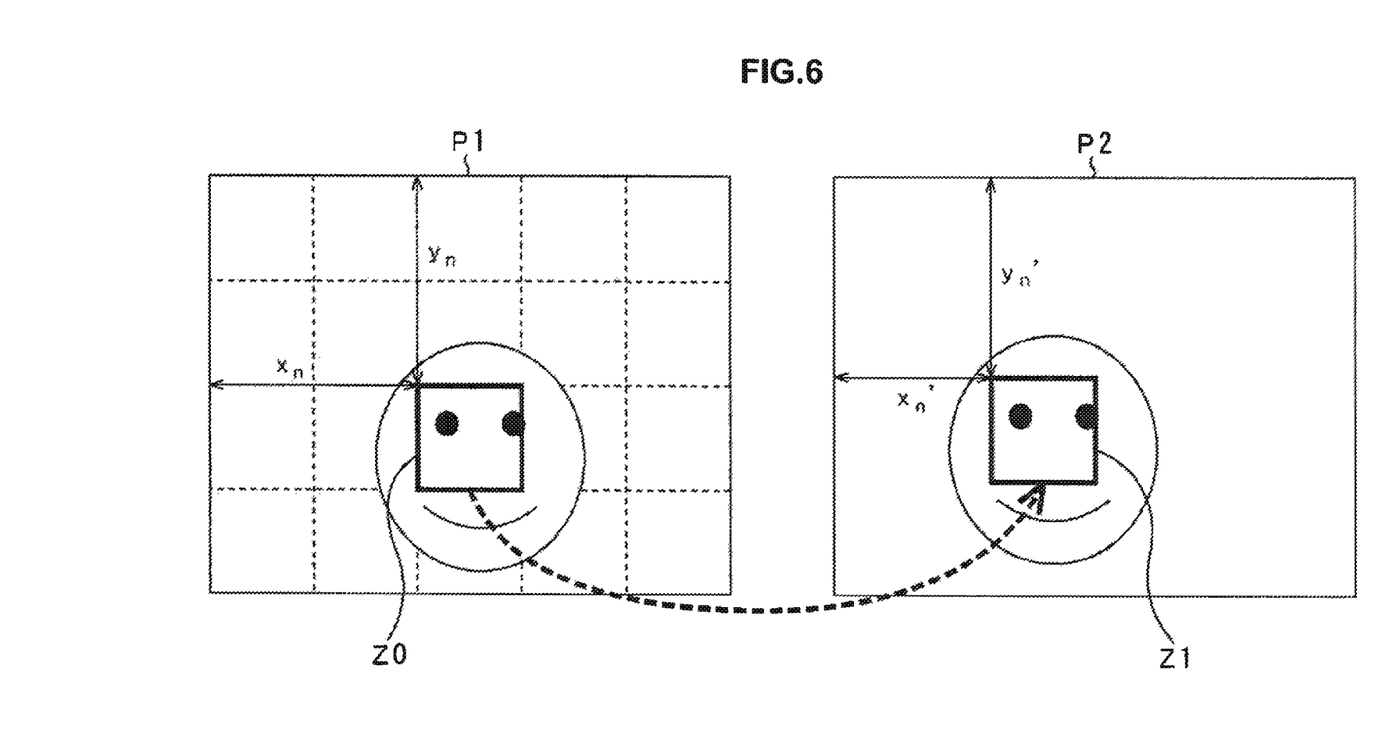
FIG. 6 is a diagram illustrating the left and right recognition processing by the image processing portion shown in FIG. 4.

At step S14, the disparity direction detection portion 51 calculates a difference, in the horizontal direction, between the reference area on the image supplied from the image acquisition portion 31-1 and the corresponding area on the image supplied from the image acquisition portion 31-2 that has been searched by the template matching. More specifically, as shown in FIG. 6 for example, when an upper left coordinate of a block that is a reference area Z0 on an image P1 that is supplied from the image acquisition portion 31-1 is (xn, yn) and an upper left coordinate of a block that is a reference area Z1 on an image P2 that is supplied from the image acquisition portion 31-2 is (xn', yn'), the disparity direction detection portion 51 calculates the difference in the horizontal direction as (xn'-xn) and stores the resulting value.

At step S15, the disparity direction detection portion 51 determines whether or not there are unprocessed blocks in the image supplied from the image acquisition portion 31-1. When there are the unprocessed blocks, the processing returns to step S13. Specifically, the processing from step S13 to step S15 is repeated until all the blocks on the image supplied from the image acquisition portion 31-1 have been taken as the reference areas, the corresponding areas on the image supplied from the image acquisition portion 31-2 have been detected and all of the differences in the horizontal direction have been calculated. Then, when it is determined at step S15 that there are no more unprocessed blocks, the processing advances to step S16.

At step S16, the disparity direction detection portion 51 calculates an average value of the calculated differences in the horizontal direction, and supplies the average value to the image switching portion 52, as the displacement evaluation value between the images. Specifically, when a number n of the blocks is N (n=0 to N-1), the disparity direction detection portion 51 calculates the displacement evaluation value by performing a calculation represented by the following formula.

$$E = \frac{1}{N} \sum_{n=0}^{N-1} (x'_n - x_n)$$

Here, E is the displacement evaluation value, N is the number of blocks and n is a block identifier. By calculating the horizontal direction statistically as an average value in this way, it is possible to statistically reduce errors in the template matching. It should be noted that, in the template matching, reliability may be calculated in advance by calculating a luminance dispersion of the matching areas, and the average value of the differences in the horizontal direction of matching areas with high reliability only may be calculated as the displacement evaluation value.

At step S17, the image switching portion 52 controls the left/right determination portion 61 and causes the left/right determination portion 61 to determine, based on the displacement evaluation value E, which of the images supplied, respectively, from the image acquisition portions 31-1 and 31-2 is the image for the left eye and which is the image for the right eye. Specifically, when the displacement evaluation value E between the images P1 and P2 is E<0, as shown in FIG. 6, the corresponding point of the image P2 is statistically positioned to the left side with respect to the reference area of the image P1, and thus, the image P1 is the image for the right eye and the image P2 is the image for the left eye. In contrast, when the displacement evaluation value E between the images P1 and P2 is E>0, the corresponding point of the image P2 is statistically positioned to the right side with respect to the reference area of the image P1, and thus, the image P1 is the image for the left eye and the image P2 is the image for the right eye. The left/right determination portion 61 determines which of the images supplied, respectively, from the image acquisition portions 31-1 and 31-2 is the image for the left eye and which is the image for the right eye based on whether the displacement evaluation value is positive or negative, in the manner described above.

At step S18, based on the determination result of the left/right determination portion 61, the image switching portion 52 switches the images from each of the image acquisition portions 31-1 and 31-2, and outputs the image for the left eye from the left eye image output terminal 52a and outputs the image for the right eye from the right eye image output terminal 52b.

By the above-described processing, no action is required from the user, and the image for the left eye and the image for the right eye can be recognized solely from the two images and output in accordance with a recognition result. It should be noted that, when using the image processing portion 12 shown in FIG. 14, it is assumed that the two camera modules 21-1 and 21-2 used to capture the two images have a structure in which they are arranged with a different x coordinate in the horizontal direction (a baseline length in the horizontal direction). Further, it is preferable for the template matching to be performed using a technique in which an influence of brightness between the two images is reduced, such as normalized correlation or the like.

In addition, with the image processing portion 12 shown in FIG. 4, as there is no action by the user, it is possible to realize mapping of the images captured by the left and right camera modules 21 while further reducing a burden on the user. However, while it is preferable for a light axis of the stereo camera formed of the two camera modules 21 to be horizontal, namely, for an angle of convergence with respect to a point at infinity to be zero, significant displacement occurs in some cases. Specifically, it is possible that an "amount of displacement between images that causes displacement in the angle of convergence" becomes larger than an "amount of displacement caused by the baseline length." In this type of case, the image processing portion 12 shown in FIG. 4 cannot always appropriately recognize the left and right images. On the other hand, the image processing portion 12 shown in FIG. 1 is not influenced by displacement of the optical axis, and even if positional and rotational displacement are relatively large and the "amount of displacement between images that causes displacement in the angle of convergence" becomes larger than the "amount of displacement caused by the baseline length," it is possible to appropriately identify the left and right images. In this way, it is preferable to change the method of realization depending on conditions, including application and environmental conditions and so on.

The above-described series of processing can be performed by hardware or can be performed by software. When the series of processing is performed by software, a program that forms the software is installed from a storage medium to a computer that is incorporated in a dedicated hardware, or to, for example, a general-purpose personal computer that can perform various types of functions by installing various types of programs.

Figure 7:
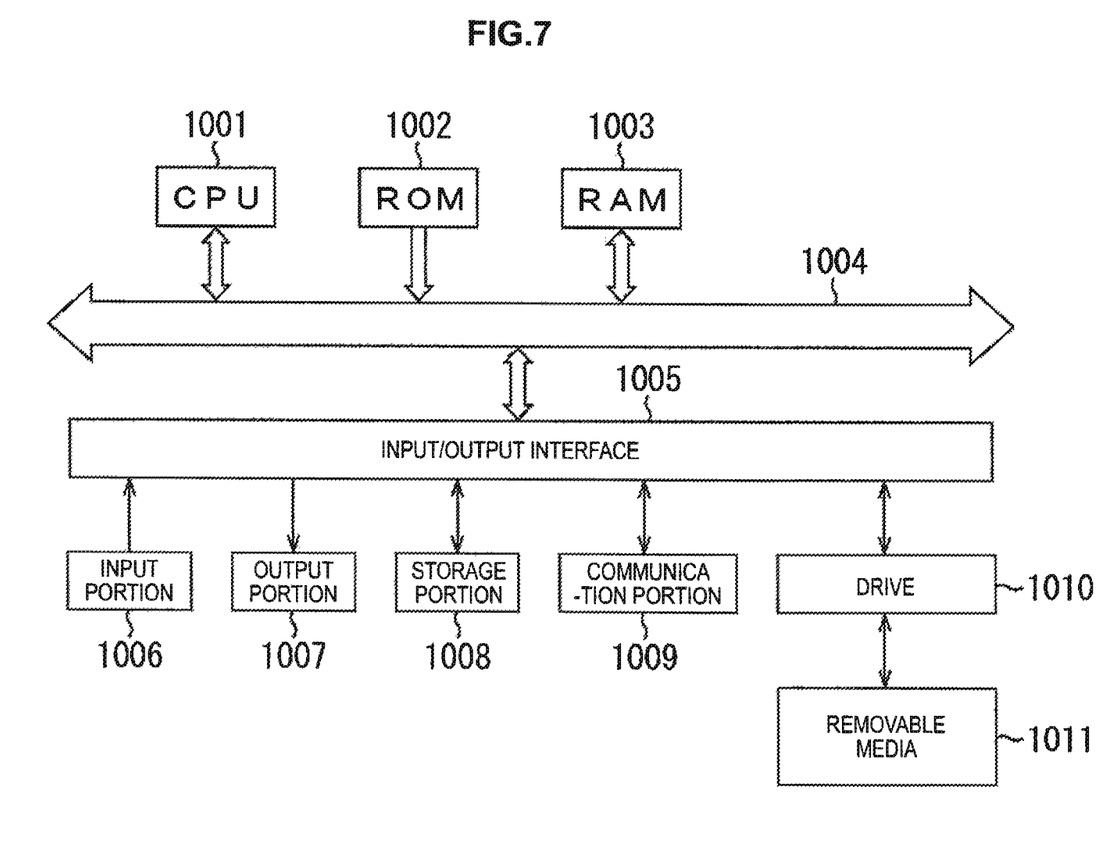
FIG. 7 is a diagram describing a structural example of a general-purpose personal computer.

FIG. 7 shows a structural example of a general-purpose personal computer. The personal computer has a built-in central processing unit (CPU) 1001. An input/output interface 1005 is connected to the CPU 1001 via a bus 1004. A read only memory (ROM) 1002 and a random access memory (RAM) 1003 are connected to the bus 1004.

An input portion 1006, which is an input device on which a user can input operation commands, such as a keyboard, a mouse and the like, is connected to the input/output interface 1005. An output portion 1007, which performs output to a device that displays various operation screens and processing results, and a storage portion 1008, which is formed by a hard drive and the like and which stores programs and various data, are also connected to the input/output interface 1005. Further, a communication portion 1009 that is formed by a local area network (LAN) adaptor and the like and which performs communication processing via a network such as the Internet, is also connected to the input/output interface 1005. In addition, a drive 1010 is connected to the input/output interface 1005. The drive 1010 reads and writes data to and from a removable media 1011 that is formed by a magnetic disk (including a flexible disk), an optical disk (including a compact disc-read only memory (CD-ROM), a digital versatile disc (DVD) and the like), an magneto-optical disk (including a mini disc (MD) and the like), a semiconductor memory or the like.

The CPU 1001 performs various types of processing in accordance with a program stored in the ROM 1002, or in accordance with a program that is read out from the removable media 1011 (the magnetic disk, optical disk, magneto-optical disk or semiconductor memory) and installed in the storage portion 1008 and then loaded from the storage portion 1008 to the RAM 1003. Data etc. that is necessary for the CPU 1001 to perform the various types of processing is also stored in the RAM 1003 as appropriate.

Note that, in this specification, steps that write the program to be recorded in the storage medium do not necessarily have to be performed chronologically in a time series in the order described above, and, even if not performed chronologically, may include processing that is performed in parallel or individually.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An image processing device including:

capturing portions that respectively capture a first image and a second image that form an image for a right eye and an image for a left eye which can be stereoscopically viewed in three dimensions;

a comparison portion that compares the first image and the second image captured by the capturing portions;

a determination portion that determines, based on a comparison result of the comparison portion, which of the first image and the second image is the image for the right eye and which is the image for the left eye; and an output portion that outputs each of the first image and the second image, as the image for the right eye and the image for the left eye, based on a determination result of the determination portion.

(2) The image processing device according to (1), further including:

a prompting portion that prompts a user to pass a hand in front of one of the capturing portions that captures one of the image for the left eye and the image for the right eye, wherein the comparison portion compares a luminance or chroma saturation of each of the first image and the second image captured by the capturing portions, and wherein the determination portion determines, using a comparison result of the comparison portion, which of the first image and the second image has the lower luminance or chroma saturation, thus determining which has been subject to the prompting by the prompting portion and determining which of the first image and the second image is the image for the left eye and which is the image for the right eye.

(3) The image processing device according to (1), wherein the comparison portion extracts a block of a predetermined size at a predetermined position of the first image, performs template matching of the extracted block on the second image, and compares a position of a matching block on the second image with a position of the predetermined block on the first image, and wherein the determination portion, based on a relationship in the left-right direction between the position of the matching block on the second image and the position of the predetermined block on the first image, determines which of the first image and the second image is the image for the left eye and which is the image for the right eye.

(4) An image processing method including:

capturing, using capturing portions that respectively capture a first image and a second image that form an image for a right eye and an image for a left eye which can be stereoscopically viewed in three dimensions, the first image and the second image that form the image for the right eye and the image for the left eye which can be stereoscopically viewed in three dimensions;

comparing, using a comparison portion that compares the first image and the second image captured by the capturing portions, the first image and the second image captured in processing in the capturing;

determining, using a determination portion that determines, based on a comparison result of the comparison portion, which of the first image and the second image is the image for the right eye and which is the image for the left eye, which of the first image and the second image is the image for the right eye and which is the image for the left eye based on a comparison result obtained in processing in the comparing; and outputting, using an output portion that outputs each of the first image and the second image, as the image for the right eye and the image for the left eye, based on a determination result of the determination portion, each of the first image and the second image as the image for the right eye and the image for the left eye based on a determination result obtained in processing in the determining.

(5) A program including instructions that command a computer that controls an image processing device including capturing portions that respectively capture a first image and a second image that form an image for a right eye and an image for a left eye which can be stereoscopically viewed in three dimensions, a comparison portion that compares the first image and the second image captured by the capturing portions, a determination portion that determines, based on a comparison result of the comparison portion, which of the first image and the second image is the image for the right eye and which is the image for the left eye, and an output portion that outputs, as the image for the right eye and the image for the left eye, each of the first image and the second image based on a determination result of the determination portion, the instructions commanding the computer to perform capturing, using the capturing portions, each of the first image and the second image that form the image for the right eye and the image for the left eye which can be stereoscopically viewed in three dimensions, comparing, using the comparison portion, the first image and the second image captured in processing in the capturing, determining, using the determination portion, which of the first image and the second image is the image for the right eye and which is the image for the left eye based on a comparison result obtained in processing in the comparing, and outputting, using the output portion, each of the first image and the second image as the image for the right eye and the image for the left eye, based on a determination result obtained in processing in the determining.

What is claimed is:

1. An image processing device comprising:
    a comparison portion that compares a first image and a second image; and
    a determination portion that determines, based on a comparison result of the comparison portion, which of the first image and the second image is the image for a right and which is the image for a left,
    wherein the comparison portion
        performs template matching, on the second image, of a block extracted from the first image,
        compares a position of a matching block on the second image with a position of a block of a predetermined size on the first image,
        calculates a reliability by calculating a luminance dispersion of the matching block, and
        calculates, as a displacement evaluation value, an average value of differences in a horizontal direction of matching blocks with reliability higher than a threshold,
    wherein the comparison portion and the determination portion are each implemented via at least one processor.

2. The image processing device according to claim 1, further comprising:
    an output portion that outputs each of the first image and the second image, as the image for the right and the image for the left, based on a determination result of the determination portion.

3. The image processing device according to claim 1,
    wherein the determination portion, based on a relationship in the left-right direction between the position of the matching block on the second image and the position of the block of the predetermined size on the first image, determines which of the first image and the second image is the image for the left and which is the image for the right.

4. An image processing method comprising:
    comparing a first image and a second image by performing template matching, on the second image, of a block extracted from the first image, comparing a position of a matching block on the second image with a position of a block of a predetermined size on the first image, calculating a reliability by calculating a luminance dispersion of the matching block, and calculating, as a displacement evaluation value, an average value of differences in a horizontal direction of matching blocks with reliability higher than a threshold; and
    determining, based on a comparison result of the comparing, which of the first image and the second image is the image for a right and which is the image for a left.

5. The image processing method according to claim 4, further comprising:
    outputting each of the first image and the second image, as the image for the right and the image for the left, based on a determination result of the determining.

6. The image processing device according to claim 4,
    wherein the determination as to which of the first image and the second image is the image for the left and which is the image for the right is made based on a relationship in the left-right direction between the position of the matching block on the second image and the position of the block of the predetermined size on the first image.

7. A non-transitory computer-readable medium having embodied thereon a program, which when executed by a computer causes the computer to execute an image processing method, the method comprising:

comparing a first image and a second image by performing template matching, on the second image, of a block extracted from the first image, comparing a position of a matching block on the second image with a position of a block of a predetermined size on the first image, calculating a reliability by calculating a luminance dispersion of the matching block, and calculating, as a displacement evaluation value, an average value of differences in a horizontal direction of matching blocks with reliability higher than a threshold; and determining, based on a comparison result of the comparing, which of the first image and the second image is the image for a right and which is the image for a left.

8. The non-transitory computer-readable medium according to claim 7, wherein the executed method further comprises:

outputting each of the first image and the second image, as the image for the right and the image for the left, based on a determination result of the determining.

9. The non-transitory computer-readable medium according to claim 7, wherein the determination as to which of the first image and the second image is the image for the left and which is the image for the right is made based on a relationship in the left-right direction between the position of the matching block on the second image and the position of the block of the predetermined size on the first image.

10. The image processing device according to claim 1, wherein the comparison portion further extracts, as the extracted block, the block of the predetermined size at a predetermined position of the first image.

11. The image processing device according to claim 10, wherein the comparison portion further calculates a difference in the horizontal direction between the position of the matching block on the second image and the position of the block of the predetermined size on the first image.

12. The image processing device according to claim 1, wherein the comparison portion further calculates a difference in the horizontal direction between the position of the matching block on the second image and the position of the block of the predetermined size on the first image.

13. The image processing method according to claim 4, further comprising:

extracting, as the extracted block, the block of the predetermined size at a predetermined position of the first image.

14. The image processing method according to claim 13, further comprising:

calculating a difference in the horizontal direction between the position of the matching block on the second image and the position of the block of the predetermined size on the first image.

15. The image processing method according to claim 4, further comprising:

calculating a difference in the horizontal direction between the position of the matching block on the second image and the position of the block of the predetermined size on the first image.

16. The non-transitory computer-readable medium according to claim 7, wherein the execute method further comprises:

extracting, as the extracted block, the block of the predetermined size at a predetermined position of the first image.

17. The non-transitory computer-readable medium according to claim 16, wherein the execute method further comprises:

calculating a difference in the horizontal direction between the position of the matching block on the second image and the position of the block of the predetermined size on the first image.

18. The non-transitory computer-readable medium according to claim 7, wherein the execute method further comprises:

calculating a difference in the horizontal direction between the position of the matching block on the second image and the position of the block of the predetermined size on the first image.

* * * * *